Figure 1:
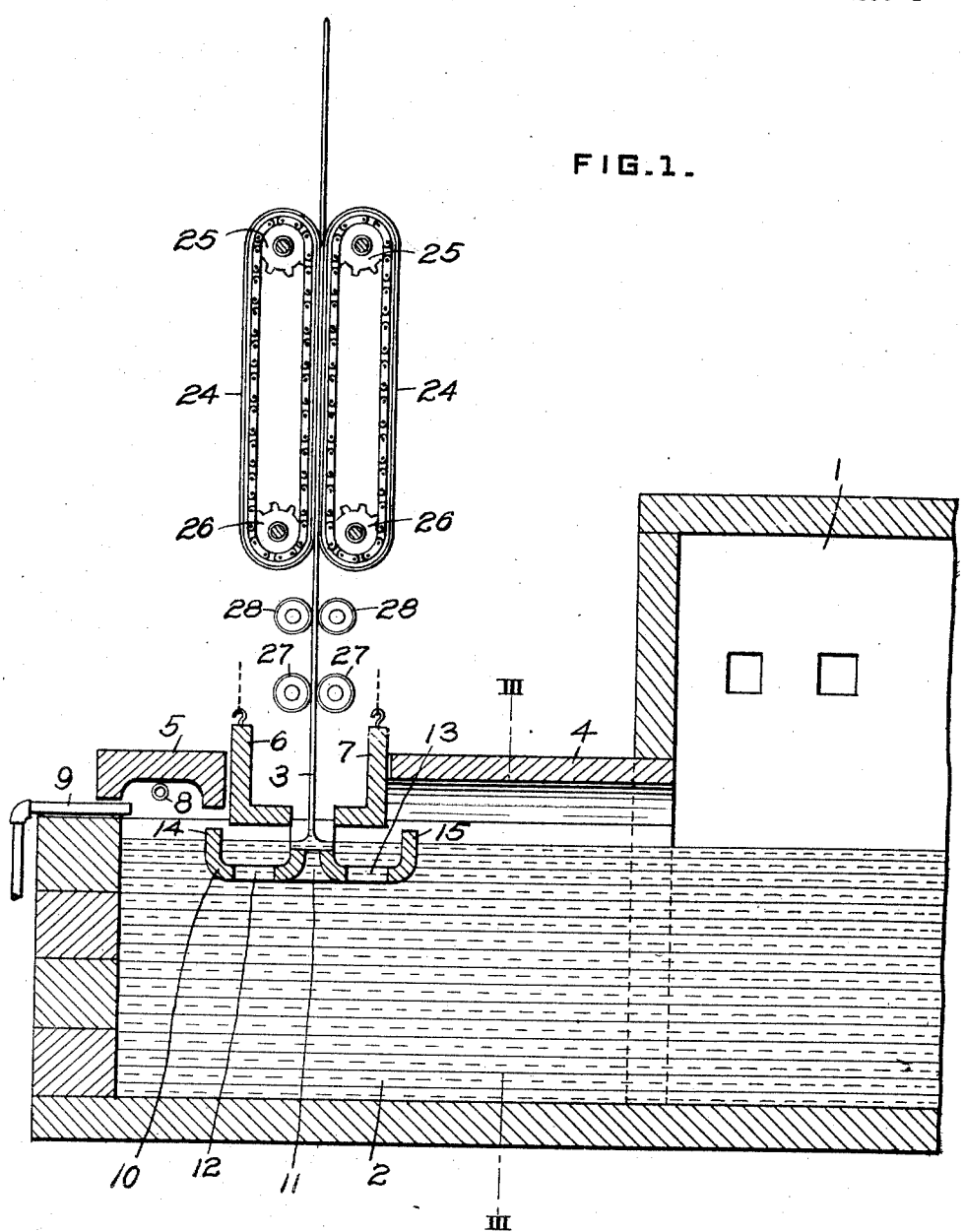

Dec. 15, 1925. 1,565,821

H. G. SLINGLUFF

APPARATUS FOR DRAWING SHEET GLASS

Original Filed Nov. 8, 1921  3 Sheets-Sheet 1

INVENTOR

Dec. 15, 1925.  1,565,821
H. G. SLINGLUFF
APPARATUS FOR DRAWING SHEET GLASS
Original Filed Nov. 8, 1921   3 Sheets-Sheet 2

INVENTOR
H. G. Slingluff
by James C. Bradley
atty

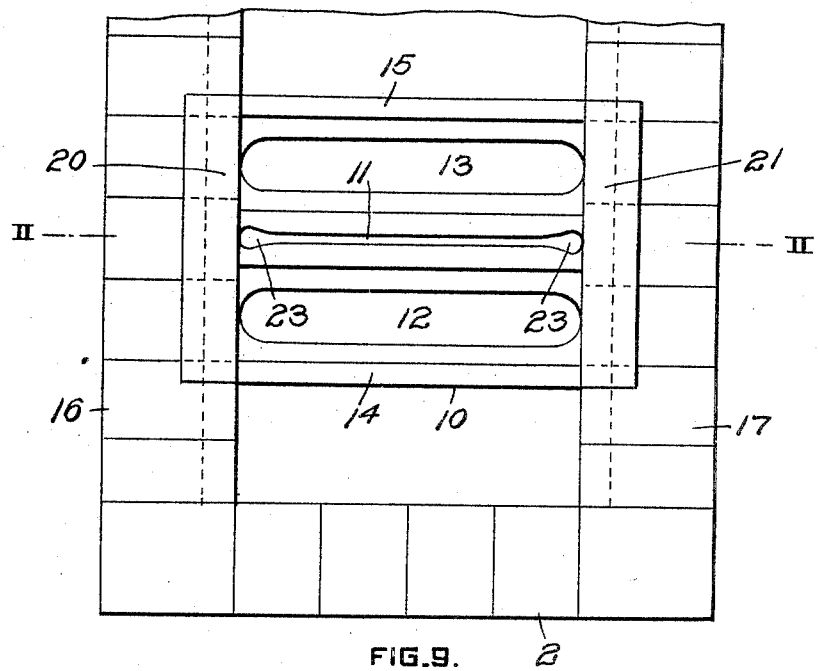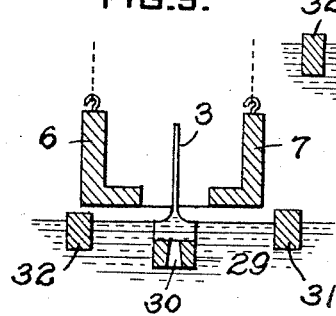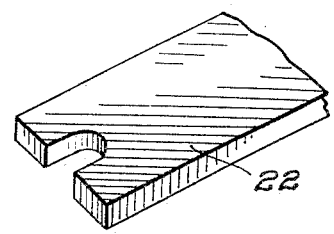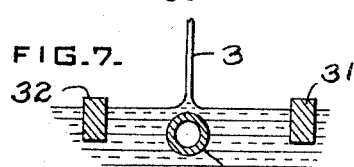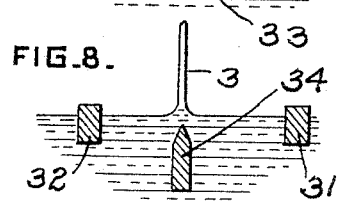

Patented Dec. 15, 1925.

1,565,821

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

APPARATUS FOR DRAWING SHEET GLASS.

Application filed November 8, 1921, Serial No. 513,677. Renewed October 16, 1925.

*To all whom it may concern:*

Be it known that I, HARRY G. SLINGLUFF, a citizen of the United States, and a resident of Mount Vernon, in the county of Knox and State of Ohio, have made a new and useful invention in Improvements in Apparatus for Drawing Sheet Glass, of which the following is a specification.

In Letters Patent No. 1,364,895, dated January 11th, 1921, I described and claimed a process of drawing sheet glass having among its objects the prevention of the shifting of the line of generation of the sheet over the surface of the bath of molten glass, the prevention of warping of the sheet, and the avoidance of "lines" visible in the faces of the sheet. In the practice of the said process these several objects were measurably attained, but the first two not to such a degree as to entirely eliminate the subsequent operation of flattening the glass sheets thus produced, and it is the object of the present invention to more perfectly obtain the results above specified, and indeed completely so, for by its practice I have produced, in the drawing operation alone, sheet glass of uniform thickness, which requires no subsequent flattening, and which is free from lines and other recognized defects.

In the accompanying drawings I show novel apparatus suitable for the practice of the new process to be described.

Figure 2:
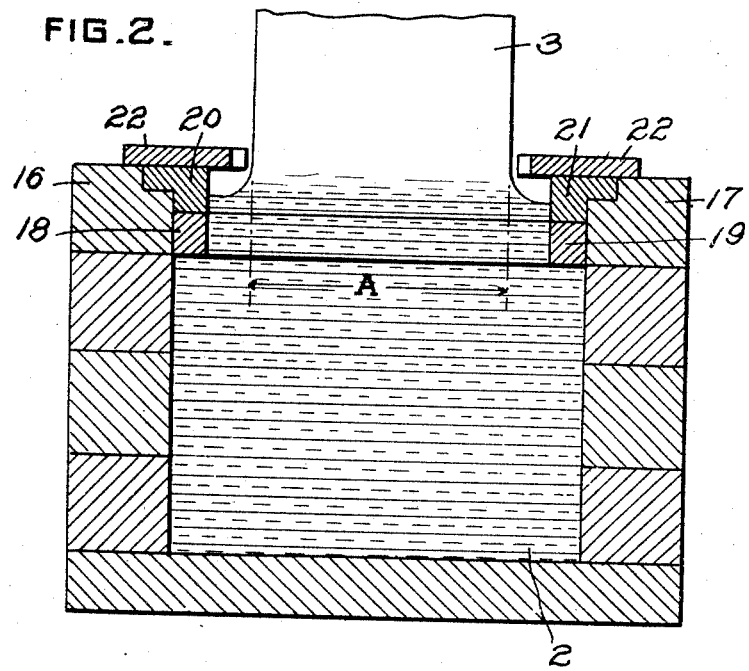
Figure 3:
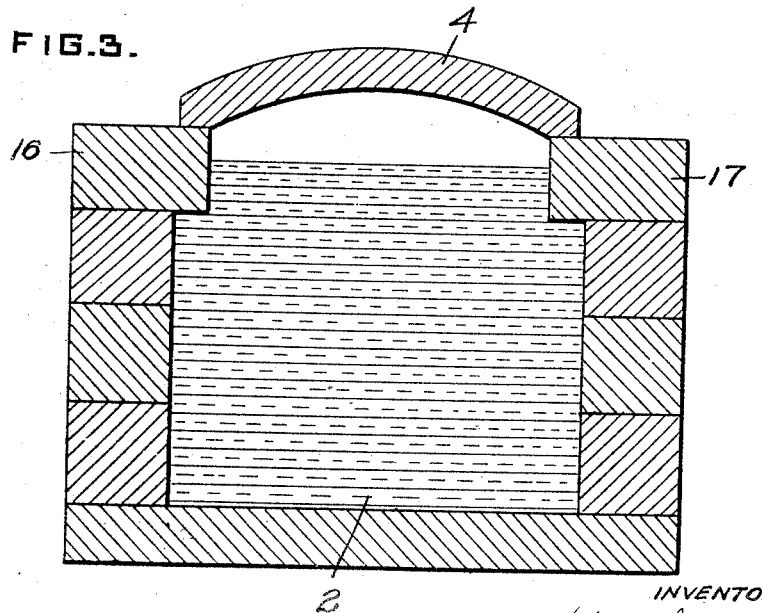

Figure 1 is a vertical section taken through the drawing tank. Fig. 2 is a section on the line II—II of Fig. 4. Fig. 3 is a section on line III—III of Fig. 1. Fig. 4 is a partial plan view of the central portion of the drawing tank with the top thereof removed. Fig. 5 is a section through a modified type of submerged clay work. Fig. 6 is a perspective view of one of the shielding blocks employed adjacent the edges of the sheet being drawn. And Figs. 7, 8 and 9 are sections through still other modified forms of clay work in the glass bath.

Referring to Figures 1–4 of the drawings, 1 is the melting tank, which may be of any approved form and which preferably is provided with the usual regenerative heating means, and 2 is the drawing tank. As indicated in Fig. 1, the drawing tank 2 is preferably of considerable depth, preferably such as to give a depth of glass of from two to four feet. The depth may, however, be modified to suit conditions, and, if desired, suitable additional heating means may be employed around or beneath the drawing tank, as is well known in the art, to maintain the body of glass at a constant temperature. The width of the tank depends upon the width of the sheet which it is desired to draw, such width being, for instance, about four feet where the width of the sheet to be drawn is three feet. As shown in Fig. 3 the communicating passage between the melting tank and the drawing tank is of the full width of the drawing tank, so that there is no throttling of the flow of glass from the melting tank. This arrangement is advantageous, since it tends to maintain uniform temperature conditions in and adjacent to the line of generation of the sheet.

The drawing tank is capped by the arch 4 at the end adjacent to the melting tank and by the block 5 at its opposite end. A pair of shielding members 6 and 7, L-shaped in cross section, are provided on opposite sides of the line of draw, which shielding members may be supported for vertical adjustment if desired by means not shown, but illustrated in my copending application Serial No. 265,443. The outer end of the drawing tank is heated by a plurality of burners 8 and 9.

As means contributing to the fixation and maintenance of a constant line of generation of the sheet, I form below the surface of the glass in the drawing tank, and having the top surfaces of its opposite walls covered by the molten glass, a vertical slot or passageway extending longitudinally beneath the desired line of generation. I term this slot or passageway the guiding slot. As shown in Figures 1 and 4 of the drawings, it is the slot 11 formed in the center of the refractory trough 10, which extends transversely across the drawing tank 2 and is suitably held in place as hereinafter described. This guiding slot is preferably about two inches wide at the top, and may be widened out downwardly as shown, and because of the tendency of the glass to cool in the neighborhood of the side walls of the tank, it may be somewhat enlarged at its opposite ends, as shown at 23, Figure 4. While the depth of its position may vary, I have obtained satisfactory results when the top surfaces of its opposite walls are located about four inches beneath the surface of the molten glass. In the trough shown in Figures 1 and 4 there may be additional slots 12 and 13 formed on opposite sides of the guiding slot 11, and of the general form shown in Figure 4. The longitudinal edges 14 and 15 of the trough 10 extend above the surface of the glass as indicated in Fig. 1, with their inner edges adjacent to the rear corners of the shields 6 and 7, the space left serving to permit a circulation of hot gases over the edges of the trough and upon the surface of the body of glass lying therein.

The upper tier of blocks 16 and 17 constituting a part of the side walls of the drawing tank are preferably extended inward so as to form an overhang, as indicated in Figs. 2 and 3, and this overhang is slotted vertically so as to receive the end portions 18 and 19 of the trough 10, blocks 20 and 21 then being fitted into the space over the ends 18 and 19, as indicated in Figs. 2 and 4. The overhang gives a body of glass in the tank of relatively large volume as compared with the width of the sheet 3 which is to be drawn, so that the heat storage capacity of the tank is made relatively large, and the tendency is to assist in maintaining a uniform temperature in the body of glass across the area marked A in Fig. 2 and corresponding to the width of the sheet.

In order to still further offset the tendency of the side portions of the bath, from which the edge portions of the sheet are drawn, to cool more rapidly than the central portion of the body of glass, due to the proximity of the side walls of the tank, reflecting blocks 22 are employed, as indicated in Figs. 2 and 6, such blocks resting upon the side walls of the tank in line with the sheet being drawn and overhanging the surface of the bath. These blocks reflect a portion of the heat radiated from the surface of the glass, so that when adjusted inward, a greater heating effect is secured therebeneath. They lie freely movable in position upon the side walls of the tank so that they may be adjusted to meet requirements.

The opposite edge portions 14 and 15 of the trough 10 act as skimmers to prevent any surface impurities from gaining access to the area of the surface of molten glass from which the sheet is drawn. But they are spaced so far away from the line of generation of the sheet that they have no material chilling effect, and a sheet will also be produced free from the surface defect known as "lines". I have found that where a sheet is drawn with the edge of its meniscus touching or in proximity to a clay body, lines are produced in the faces of the sheet. In certain of the appended claims therefore I direct that the sheet shall be drawn upward with its line of generation "remote" from such refractory bodies, the word "remote" being used to distinguish from methods which have been proposed, in which the edge of the meniscus of the sheet being drawn does either touch or lie in proximity to a refractory body or bodies. In the present case I prefer that the upwardly projecting portions 14 and 15 of the trough 10 shall be spaced about 12 inches on each side from the line of generation of the sheet.

In Figure 5 of the drawings I have shown in fragmentary cross section an alternative arrangement which may be used instead of the trough 10. In this case the guiding slot 30 is formed in the bar 29 extending transversely across the drawing tank, and supported in the opposite side walls thereof in the same manner as the trough 10. The bar 29 is preferably located from 3 to 4 inches beneath the surface of the glass. It will, of course, be apparent that, instead of forming the slot 30 in an integral bar, it can be formed between two separate bars of refractory material, or in some cases between a pair of pipes of refractory material, or metal covered by clay, which will not affect the quality of the glass, such pipes being indicated at 35 in Fig. 9, and being subject to the passage of a cooling fluid.

Transverse skimming bars 31 and 32 are located in the surface of the bath on opposite sides of the line of generation of the sheet, and take the place and perform the functions of the upwardly projecting edges 14 and 15 of the trough 10, in this case also there being spaces left between the skimming bars and the corners of the shields 6 and 7 to permit circulation of hot gases over the surface of the body of glass bounded by the skimming bars. These skimming bars and the edges 14 and 15 of the trough 10 also alike perform the additional function of retarding any surface flow of glass which might tend to distort the line of generation of the sheet.

The sheet may be drawn by any desired type of drawing mechanism, but the type illustrated in the said Letters Patent No. 1,364,895 is preferred, such type of apparatus being illustrated generally in Figure 1 of the drawings of the present application. This apparatus in its simplest form comprises a pair of endless belts 24 of asbestos carried by the pulleys 25 and 26 which are driven by suitable mechanism not shown. This belt apparatus prevents the glass from cooling too rapidly, and after it has passed the upper pulleys 25, the sheet may be cut off by any suitable means. Asbestos rolls 27 and 28 may also be used intermediate the bath and the asbestos belts, and such rolls may also be driven by means not shown.

In order to counteract the tendency of the sheet to draw in at its edges and thus narrow, I preferably employ the tool and method for preserving the width of the sheet shown and described in Letters Patent No. 1,276,975. Any other suitable means, however, may be employed for this purpose so long as it is of such character as not to cool the portions of the bath from which the edges are generated to such a degree as to set up excessive strains in the glass sheet, thereby causing warping and often breakage.

It will also be understood that the rate of cooling of the sheet and the consequent speed of draw permissible may be increased by the use of coolers arranged above the surface of the bath on opposite sides of and close to the line of generation of the sheet, for example such as are illustrated in Letters Patent No. 766,275.

It has been found in practice, in the operation of the process above described, that the line of generation of the sheet is maintained constant for practically an indefinite period of time. I believe this to be the predominating function of the guiding slot, assisted by the wide passage between the melting tank and the drawing tank, and the other means adopted and precautions taken to insure uniformity of temperature throughout the area from which the sheet is drawn.

I also believe that the prevention of warping is due to careful preservation of the same uniformity of temperature, particularly throughout the line of generation of the sheet itself. The only operation conducing to any non-uniformity at all is the slight cooling due to the use at intervals of the edge-maintaining tool above referred to.

I still further believe that the avoidance of lines in the surface of the sheet is due to the separation or "remoteness" of the line of generation of the sheet from any refractory body or bodies projecting above the surface of the bath on the opposite sides of such line of generation.

It will, of course, be understood that the process herein described may be practiced by the use of other forms of apparatus and co-operating devices, and other modifications may be made within the limits defined by the appended claims. While the guiding and position determining function is best performed by the slot construction, such function is performed to a less degree by guide members, such as the pipe 33 of Fig. 7, through which a cooilng fluid may be circulated, or such as the refractory bar 34 of Fig. 8.

What I claim is:

1. In combination in apparatus for drawing sheet glass, a melting tank adapted to carry a molten bath, a drawing tank communicating therewith and provided with a pair of opposing transverse depending shields spaced apart to provide a drawing opening, a central refractory part extending transversely across the tank beneath the drawing opening and entirely submerged in the glass bath, a pair of transverse refractory parts lying in the drawing tank on either side of the first part with the upper edges thereof lying above the surface of the glass bath, and means for drawing a sheet of glass upward from the bath with its line of generation in alignment with said refractory part, the said pair of refractory parts being spaced away from the line of generation of the sheet a distance such as to avoid lining the surface of the sheet, and being separated below the surface of the bath from said central part to permit an upward flow of glass therebetween.

2. In combination in apparatus for drawing sheet glass, a glass drawing tank adapted to carry a bath of molten glass from which a sheet is to be drawn, and having a cover or top, a pair of opposing shields lying transversely of the tank and extending downward from said top to points adjacent the surface of the glass, a refractory trough extending transversely across the tank in the space beneath the shields and having its bottom submerged in the bath and slotted beneath the line of draw of the sheet, and also to the side of such slot to provide for an additional flow of glass into the trough from beneath, the said trough having its edges extending above the surface of the glass bath adjacent the rear of the shields and spaced away therefrom, and means for drawing the sheet of glass upward from the bath above the slot in alignment therewith.

3. In combination in apparatus for drawing a glass sheet, a melting tank adapted to carry a molten bath, a drawing tank communicating therewith and having the side walls at the upper edges provided with overhung portions extending along the major portion of the length of the tank and adapted to be partially submerged below the glass bath in the tank, and means for drawing a sheet upward from the bath in the drawing tank with its line of generation transverse of said tank.

4. In combination in apparatus for drawing a glass sheet, a melting tank adapted to carry a molten bath, a drawing tank communicating therewith and having the side walls at the upper edges provided with overhung portions extending along the major portion of the length of the tank and adapted to be partially submerged below the glass bath in the tank, and means for drawing a sheet upward from the bath in the drawing tank with its line of generation transverse of said tank, the said drawing tank having substantially the same width and depth at its communication with the melting tank as at the line of generation of the sheet.

5. In combination in glass drawing apparatus, a drawing tank or receptacle for containing a molten bath of glass, means for drawing a glass sheet transversely with respect to the tank with the loci of generation of the edges of the sheet adjacent the sides of the tank, and adjustable shields mounted at the sides of the tank above the surface of the glass and projecting out over the glass at the said loci of generation for regulating the temperture of the glass at such edges.

6. In combination in glass drawing apparatus, a drawing tank or receptacle for containing a molten bath of glass, means for drawing a glass sheet transversely with respect to the tank with the loci of generation of the edges of the sheet adjacent the sides of the tank, and slotted adjustable shields mounted at the sides of the tank above the surface of the glass and projecting out over the glass at the said loci of generation for regulating the temperature of the glass at such edges.

In testimony whereof, I have hereunto subscribed my name this 26th day of Oct., 1921.

HARRY G. SLINGLUFF.